M. C. SCHWEINERT AND H. P. KRAFT.
INFLATING COUPLING.
APPLICATION FILED APR. 2, 1919.
1,374,397.
Patented Apr. 12, 1921.
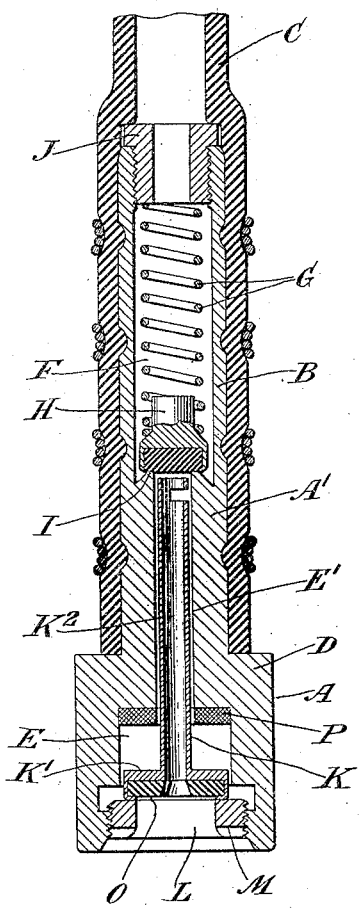

UNITED STATES PATENT OFFICE.

MAXIMILIAN CHARLES SCHWEINERT, OF WEST HOBOKEN, AND HENRY P. KRAFT, OF RIDGEWOOD, NEW JERSEY.

INFLATING-COUPLING.

1,374,397.   Specification of Letters Patent.   Patented Apr. 12, 1921.

Original application filed September 7, 1915, Serial No. 49,221. Patent No. 1,304,814, dated May 27, 1919. Divided and this application filed April 2, 1919. Serial No. 286,965.

*To all whom it may concern:*

Be it known that we, MAXIMILIAN C. SCHWEINERT and HENRY P. KRAFT, citizens of the United States of America, residing in West Hoboken, in the county of Hudson and State of New Jersey, and in Ridgewood, in the county of Bergen and State of New Jersey, respectively, have invented certain new and useful Improvements in Inflating-Couplings, of which the following is a specification.

This invention relates to inflating devices particularly adapted for use in connection with pneumatic tires. It is especially directed to a coupling for connecting a reservoir of compressed air with the pneumatic tire to be inflated. The invention relates to a valve coupling such as is applied at the end of the hose leading from the air reservoir for application to the tire valve.

The figure of the accompanying drawing is a vertical longitudinal mid-section of the coupling.

In the drawing, A indicates the casing which is formed with a reduced portion B serving as a nipple to receive the hose C, which is suitably attached as shown. At the bottom of the casing A it is enlarged to form a foot D, within which is formed a chamber E communicating by a bore E' with an upper chamber F, in which is located a check valve H pressed against a seat I by means of a spring G, the upper end of which reacts against a screw-top J which is firmly attached to the upper end of the casing. Preferably the valve seat I has a thin or sharp edge, and the valve H is formed with a gasket or seating face adapted to make an air-tight joint with said seat. The lower end of the body is formed with an opening L to admit the tire valve, this opening being formed through a threaded ring M, which is screwed into the lower end of the casing. In the chamber E is placed the head or base K' of a valve unseating device K, having a neck or stem K² which passes up through the bore E' and terminates sufficiently near the seat I so that when lifted it may unseat the valve H. The head K', is faced with a soft packing O to make a yielding engagement with the lip of the tire valve, whereby to prevent leakage of air between the coupling and such lip. Above the head K' is a packing P to prevent leakage of air between the casing and unseating device.

When the coupling is pressed down upon the top of the tire valve, the lip of the valve shell engages the packing O of the member K and presses the latter upwardly until it unseats the valve H, and the head K' engages the packing P. A tight joint is thus secured with the tire valve shell and leakage is prevented. Air under pressure from the reservoir passes down through the coupling, around the valve H, and through the bore of the stem K² and thence into the valve shell, thus unseating the tire valve and entering the tire.

It will be understood that the valve unseating member K is independent of the valve H so that the latter is free to adjust itself to the seat I. The member K requires to be held in place to keep it from falling out of the casing and this function is performed by the annular part M which closes the bottom of the chamber E. The opening L formed through the member M affords a sufficiently close fit with the threaded nipple end of the tire valve to serve as a guide for the coupling as it is applied to the tire valve. But instead of the coupling being screwed onto the threaded portion of the tire valve, it is simply pressed downward thereupon. Thus, by a simple and instantaneous operation the coupling makes a tight connection with the tire valve and unseats the check valve H so that compressed air may flow from the reservoir into the tire.

The present application is a division of our application filed September 7, 1915, Serial No. 49,221, which matured into Patent No. 1,304,814, May 27, 1919.

What we claim is:—

1. An inflating device for pneumatic tires, comprising a casing having a nipple for insertion within the hose, and a foot adapted to project beyond the end of the hose, and of larger diameter, said casing having a valve chamber formed within said nipple, and a lower chamber within said foot, with an intervening contracted passage and a valve seat at the junction of said passage and valve chamber, a check valve and spring in said valve chamber, an unseating member comprising a tubular stem movable in said passage, and a flanged portion movable within the chamber in said foot, and a retaining member closing the lower end of said chamber and having within it an unthreaded opening adapted, when the inflating device is applied to a tire valve, to receive and guide within it the nipple of such valve, whereby by pressing the inflating device endwise against a tire valve, the unseating member is displaced to unseat the check valve and admit compressed air to the tire valve.

2. An inflating device according to claim 1, the foot of the casing extended beyond the chamber within it, and internally threaded, and retaining member formed as an annular plug externally threaded and screwing into said opening.

3. An inflating device according to claim 1, the seat in the casing being upturned, the valve being an externally-cylindrical valve carrying a seating gasket on its lower face for making a tight joint with said seat, and the stem of the unseating member formed with a lateral opening, whereby when it lifts the check valve, air may flow past the check valve through such lateral opening and through the stem of said member to the tire valve.

In witness whereof, we have hereunto signed our names.

MAXIMILIAN CHARLES SCHWEINERT.
HENRY P. KRAFT.